(12) United States Patent
Kochut et al.

(10) Patent No.: US 8,977,900 B2
(45) Date of Patent: *Mar. 10, 2015

(54) REMEDIATING EVENTS USING BEHAVIORS

(71) Applicant: International Business Machines Corporation, Armonk, NY (US)

(72) Inventors: Andrzej Kochut, Croton-on-Hudson, NY (US); Steven J. Mastrianni, Unionville, CT (US); Anca Sailer, Scarsdale, NY (US); Charles O. Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/729,958

(22) Filed: Dec. 28, 2012

(65) Prior Publication Data

US 2014/0082171 A1   Mar. 20, 2014

Related U.S. Application Data

(63) Continuation of application No. 13/706,662, filed on Dec. 6, 2012.

(60) Provisional application No. 61/701,355, filed on Sep. 14, 2012.

(51) Int. Cl.
  *G06F 11/00* (2006.01)
  *H04L 12/24* (2006.01)
  *G06F 11/07* (2006.01)

(52) U.S. Cl.
  CPC ............ *H04L 41/00* (2013.01); *G06F 11/0766* (2013.01); *G06F 11/0793* (2013.01)
  USPC .............................................. 714/26; 714/25

(58) Field of Classification Search
  USPC ...................................................... 714/25, 26
  See application file for complete search history.

(56) References Cited

U.S. PATENT DOCUMENTS

| | | |
|---|---|---|
| 5,309,448 A | 5/1994 | Bouloutas et al. |
| 5,483,637 A | 1/1996 | Winokur et al. |
| 5,721,824 A | 2/1998 | Taylor |
| 5,748,098 A | 5/1998 | Grace |

(Continued)

OTHER PUBLICATIONS

Kochut et al., U.S. Appl. No. 13/706,662, filed Dec. 6, 2012, 26 pages.

(Continued)

*Primary Examiner* — Joshua P Lottich
(74) *Attorney, Agent, or Firm* — Yee & Associates, P.C.; Louis J. Percello (57) ABSTRACT

Remediating events of components using behaviors via an administrator system and an administrator client. The administrator system receives an event from a component of an information technology (IT) environment. A behavior is determined at least partly from the event. The behavior is determined to be an anomalous behavior at least partly from a group of previously received events. A coefficient is calculated, via a calculation, for the anomalous behavior at least partly from a weight. The administrator system sends a description of the anomalous behavior and a group of options to the administrator client. The description is at least partly based on the calculation. The administrator system receives a severity indication from the administrator client. The weight, the calculation, and the description are updated based on the severity indication.

25 Claims, 8 Drawing Sheets

(56) References Cited

U.S. PATENT DOCUMENTS

| | | | |
|---|---|---|---|
| 6,009,525 A | 12/1999 | Horstmann | |
| 6,532,552 B1 | 3/2003 | Benignus et al. | |
| 7,039,644 B2 | 5/2006 | Hind et al. | |
| 7,096,459 B2 | 8/2006 | Keller et al. | |
| 7,409,721 B2 | 8/2008 | Hernacki et al. | |
| 7,469,287 B1 * | 12/2008 | Castillo et al. | 709/224 |
| 7,523,349 B2 * | 4/2009 | Barras | 714/25 |
| 7,690,002 B2 * | 3/2010 | Doshi | 719/318 |
| 7,885,842 B1 | 2/2011 | Bartolini et al. | |
| 7,917,393 B2 | 3/2011 | Valdes et al. | |
| 7,954,090 B1 * | 5/2011 | Qureshi et al. | 717/127 |
| 8,010,840 B2 * | 8/2011 | Chavez et al. | 714/26 |
| 8,087,087 B1 * | 12/2011 | van Oorschot et al. | 726/25 |
| 8,095,979 B2 * | 1/2012 | McDermott et al. | 726/22 |
| 8,225,407 B1 | 7/2012 | Thrower et al. | |
| 8,935,572 B2 | 1/2015 | Kochut et al. | |
| 2004/0143753 A1 | 7/2004 | Hernacki et al. | |
| 2008/0126858 A1 * | 5/2008 | Barras | 714/25 |
| 2013/0298243 A1 * | 11/2013 | Kumar et al. | 726/25 |
| 2013/0298244 A1 * | 11/2013 | Kumar et al. | 726/25 |
| 2014/0068329 A1 * | 3/2014 | Hopper et al. | 714/25 |

OTHER PUBLICATIONS

Notice of allowance dated Sep. 5, 2014, regarding U.S. Appl. No. 13/706,662, 20 pages.

* cited by examiner

| CLUSTER/CTI | ALARM TITLE | CTI OCCURRENCE | COMMON MEASURED VALUE(S) | LAST MEASURED VALUE @ TIME | ACTION | MARK AS SIGNIFICANT |
|---|---|---|---|---|---|---|
| WIN 7 / NETWORK RetryRate NetworkIF | RATE ABOVE NORMAL |  | Intel[R] PRO_1000 MT NETWORK CONNECTION VMware ACCELERATED AMD PCNet ADAPTER - Teefer2 MINIPORT | Intel[R] PRO_1000 MT NETWORK CONNECTION @ 10/10/2011 18:01 | • DRILL DOWN | 0 |
| VDI / NETWORK RetryRate NetworkIF | RATE BELOW NORMAL |  | Intel[R] PRO_1000 MT NETWORK CONNECTION VMware ACCELERATED AMD PCNet ADAPTER - Teefer2 MINIPORT | Intel[R] PRO_1000 MT NETWORK CONNECTION @ 18/10/2011 18:05 | • DRILL DOWN<br>• MANUAL/AUTO REMEDIATION | 0 |
| ALL / EVENT LOG MONITOR EVENT LOG ENTRY AddDisk | RARE CTI |  | NONE | THE DRIVER DETECTED A CONTROLLER ERROR ON \Device\Harddisk1\DR1 @ 18/10/2011 18:02 | • DRILL DOWN<br>• MANUAL/AUTO REMEDIATION | 0 |

REMEDIATING EVENTS USING BEHAVIORS

CROSS REFERENCE TO RELATED APPLICATION

This application is a continuation of U.S. patent application Ser. No. 13/706,662, filed Dec. 6, 2012; this application claims the benefit of U.S. Provisional Application No. 61/701,355, filed Sep. 14, 2012; U.S. patent application Ser. No. 13/706,662 claims the benefit of U.S. Provisional Patent Application No. 61/701,355, filed Sep. 14, 2012; the entirety of each of these applications is incorporated by reference herein.

BACKGROUND INFORMATION

1. Field

The present invention relates generally to components of an information technology environment. More specifically, to remediating events using behaviors of the components of the information technology environment.

2. Background

Various issues may arise for users of an information technology (IT) environment that are related to the components of the IT environment. The hardware or software of the components may fail or otherwise create issues that reduce user productivity.

The components generate events related to the issues experienced by users to allow an administrator to remediate the issues and bring user productivity back to normal. A way of informing an administrator that a user is having an issue is through the use of a ticket.

The user may create a ticket that describes what the user believes is an issue. The administrator receives the ticket and may look at events generated by components that are related to the issue. Receiving the ticket after being created by a user leads to the issue persisting for that user and perhaps growing into a larger issue that affects more and more users until it is addressed by an administrator.

Therefore, it would be desirable to have a method and apparatus that takes into account at least some of the issues discussed above, as well as other possible issues.

SUMMARY

An embodiment of the present disclosure provides remediating events of components using behaviors via an administrator system and an administrator client. The administrator system receives an event from a component of an information technology (IT) environment. A behavior is determined at least partly from the event. The behavior is determined to be an anomalous behavior at least partly from a group of previously received events. A coefficient is calculated, via a calculation, for the anomalous behavior at least partly from a weight. The administrator system sends a description of the anomalous behavior and a group of options to the administrator client. The description is at least partly based on the calculation. The administrator system receives a severity indication from the administrator client. The weight, the calculation, and the description are updated based on the severity indication.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account one or more different considerations. Events that are significant can cause business impact in an IT environment, and may be hidden in the high volume of alarms generated daily for the events within the IT environment. Tickets are often subjective in nature being based on a user's description of an issue such that tickets may not indicate an actual source, cause, or significance of an issue with the IT environment. Additionally, identifying the alarms associated with an issue from a user's perspective via a ticket is a challenging task that is labor intensive for the administrator.

Embodiments that accord with the disclosure enable a personalized identification of alarms that are indicative of events that are significant. These embodiments improve incident management rate in IT environments by providing support for the administrator to filter out event that are not significant.

Figure 1:
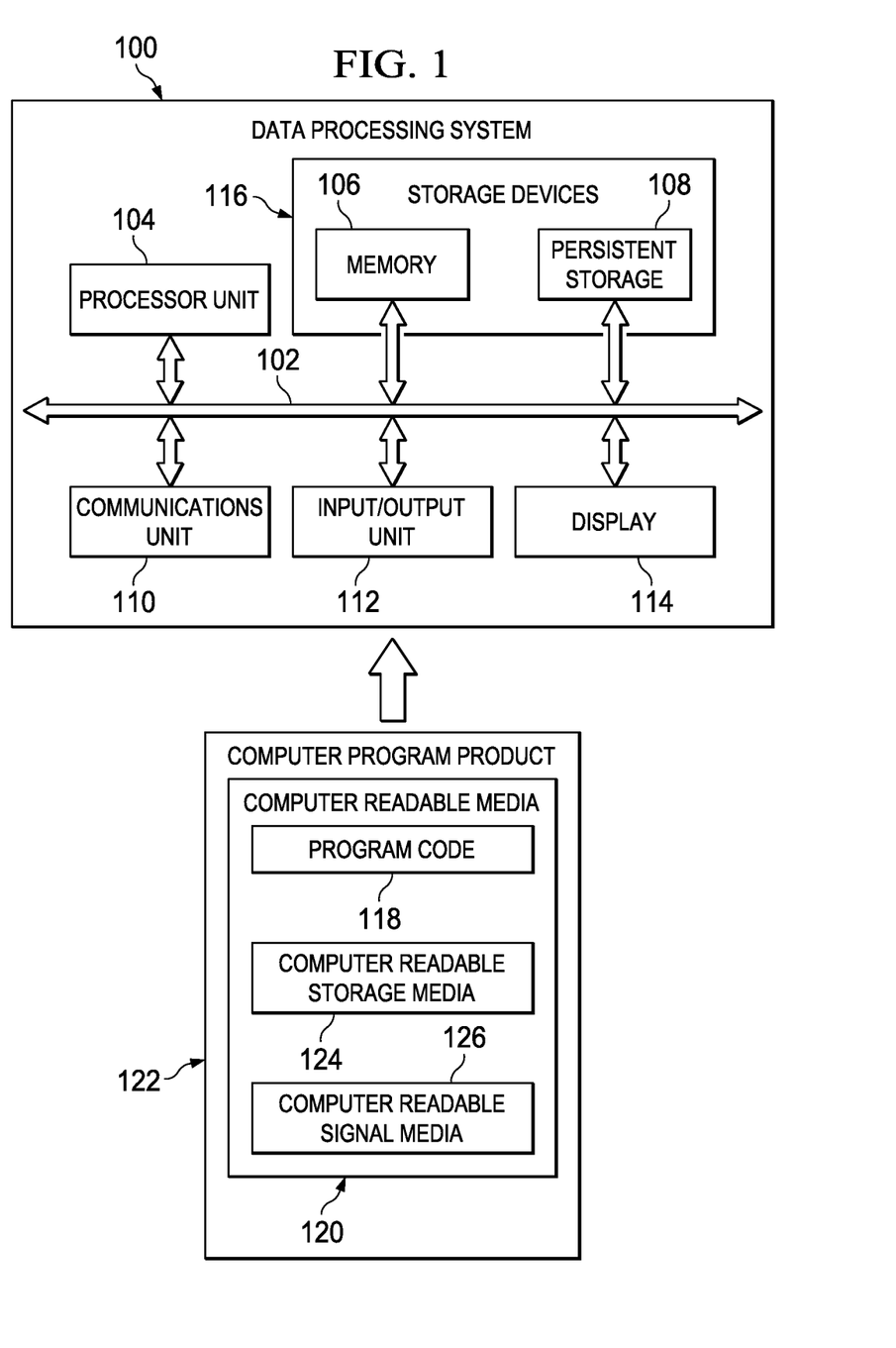
FIG. 1 is an illustration of a block diagram of a data processing system in accordance with an illustrative embodiment.

Turning to FIG. 1, an illustration of a block diagram of a data processing system is depicted in accordance with an illustrative embodiment. Data processing system 100 may be used to implement any of components 204 of information technology (IT) environment 202 of FIG. 2. In this illustrative example, data processing system 100 includes communications framework 102, which provides communications between processor unit 104, memory 106, persistent storage 108, communications unit 110, input/output (I/O) unit 112, and display 114. In this example, communication framework 102 may take the form of a bus system.

Processor unit 104 serves to execute instructions for software that may be loaded into memory 106. Processor unit 104 may be a number of processors, a multi-processor core, or some other type of processor, depending on the particular implementation.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Storage devices 116 may also be referred to as computer readable storage devices in these illustrative examples. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these illustrative examples, provides for communications with other data processing systems or devices. In these illustrative examples, communications unit 110 is a network interface card.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications framework 102. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these illustrative examples. In one example, computer readable media 120 may be computer readable storage media 124 or computer readable signal media 126.

In these illustrative examples, computer readable storage media 124 is a physical or tangible storage device used to store program code 118 rather than a medium that propagates or transmits program code 118.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 100 are not meant to provide architectural limitations to the manner in which different embodiments may be implemented. The different illustrative embodiments may be implemented in a data processing system including components in addition to and/or in place of those illustrated for data processing system 100. Other components shown in FIG. 1 can be varied from the illustrative examples shown. The different embodiments may be implemented using any hardware device or system capable of running program code 118.

Figure 2:
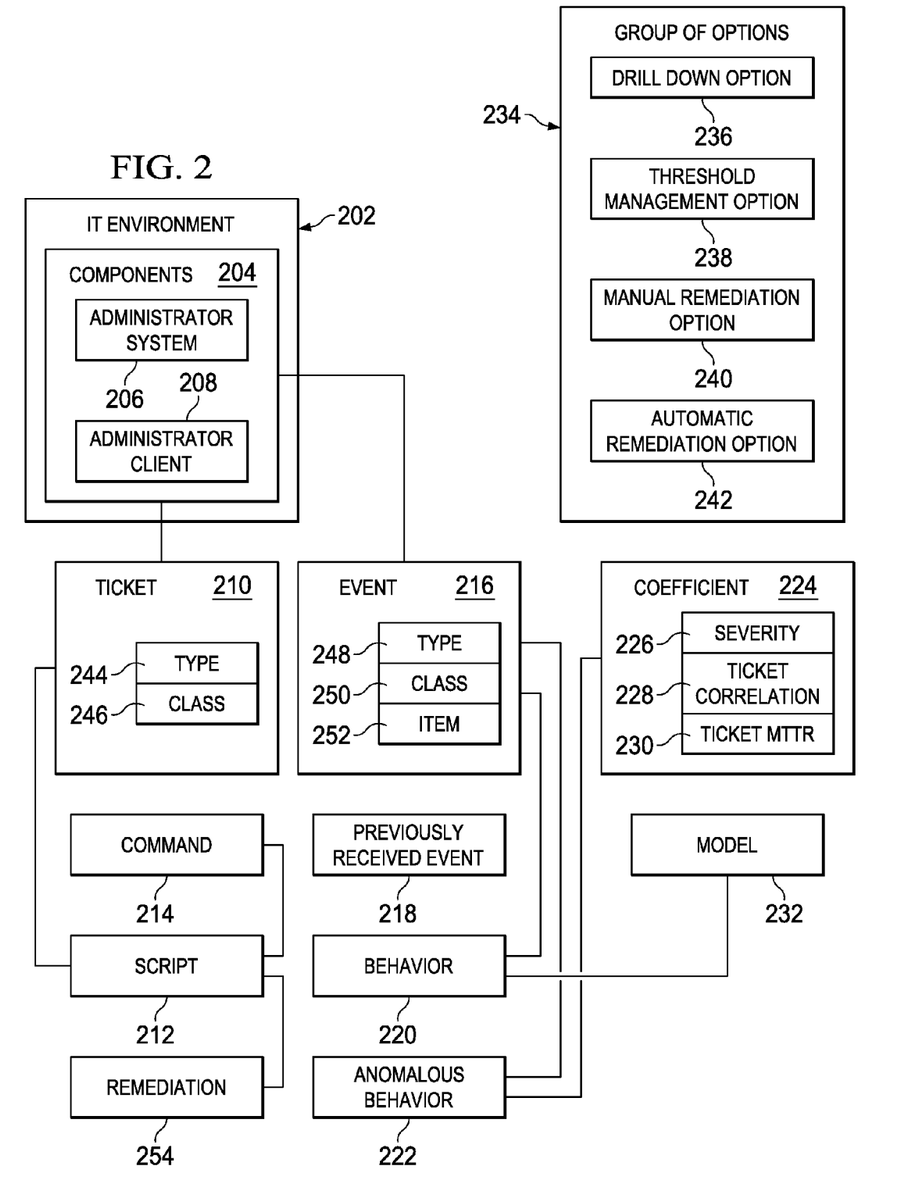
FIG. 2 is an illustration of a block diagram depicting several features in accordance with an illustrative embodiment.

Turning to FIG. 2, an illustration of a block diagram depicting several features is depicted in accordance with an illustrative embodiment. Relationships between several of the features are indicated by lines connecting such features.

Information technology (IT) environment 202 is an aggregation of all of the hardware and software used for the methods of the disclosure. IT environment 202 includes components 204.

Components 204 are the individual hardware components and software components used for the methods of the disclosure that are a part of IT environment 202. Hardware components may include computers, workstations, servers, laptops, routers, switches, and the like. Software components may include operating systems, applications, databases, and the like. Components 204 include administrator system 206 and administrator client 208.

Administrator system 206 includes the components of components 204 that are used to perform aspects of the disclosure. Administrator system 206 may include one or more servers that receive events from components 204 and send information related to the events to administrator client 208.

Administrator client 208 is used by an administrator to revive selections and indications. Administrator client 208 may be a workstation, laptop, or smart phone, or the like that is used to access and utilize administrator system 206 of IT environment 202.

Ticket 210 is a message created by the user of a component of IT environment 202 in relation to an event that happens regarding a component of IT environment 202. As an example, the user may create the ticket after an application used by the user crashes. Ticket 210 may include scripts, types, and classes, such as script 212, type 244, and class 246. Tickets may be associated with events, but not every event may be associated with a ticket. The correlation between tickets that are associated with groups of events provides a behavior that can be measured, quantified, and analyzed.

Type 244 of ticket 210 describes the type of ticket 210. Type 244 allows for a way to aggregate multiple tickets and determine relationships between multiple tickets.

Class 246 of ticket 210 describes the class of ticket 210. Class 246 allows for a way to aggregate multiple tickets and determine relationships between multiple tickets.

Command 214 is sent from administrator system 206 to an individual component to remediate an event of the individual component. As an example, a command may be reboot command to reboot a user's computer in order to remediate an event of an application crash.

Script 212 is part of a remediation, such as remediation 254, which allows an administrator to remediate and events of a component. As an example, a script may have an administrator perform a reboot of a user's computer in order to remediate an event of an application crash. Script 212 may include several commands, such as command 214, which are performed to remediate an event.

Remediation 254 is the set of steps that are to be taken to remediate an event. The steps may include scripts and commands, such as script 212 and command 214. While every event should be associated with a remediation, not every event is associated with a ticket, such as when an event is remediated before a ticket associated with the event is sent.

The hardware and software of components 204 generate events, such as event 216. Events may include: system failures, memory issues, device issues, page faults, memory leaks, network timeouts, buffer overflows, log entries, etc. Event 216 includes types, classes, and items, such as type 248, class 250, and item 252.

Type 248 of event 216 describes the type of event 216. Type 248 allows for a way to aggregate multiple events and determine relationships between multiple events.

Class 250 of event 216 describes the class of event 216. Class 250 allows for a way to aggregate multiple events and determine relationships between multiple events.

Item 252 of event 216 describes the item of event 216 and may include text indicative of an error of event 216. Item 252 allows for a way to aggregate multiple events and determine relationships between multiple events.

Previously received event 218 is received by administrator system 206 before event 216 is received by administrator system 206. Previously received events are used to generate model 232.

Behavior 220 is determined from a group of events, which may include event 216. Behaviors include: rates of events, race of event classes, variations of events within pools of the components, correlations of tickets to events, mean times to respond to events, differences between event items, differences between values within event items, times of activity for components, business impact related to events, etc. Behaviors may also be related to sequences of events and sequences of alarms related to events. The term "behaviors" is synonymous with the terms "dimensions" and "attributes."

Anomalous behavior 222 is a behavior that has been determined to be anomalous by administrator system 206. A behavior may be determined as anomalous when a current behavior based on a current model of a group of events deviates from a previous behavior of a previous model of previously received events. As an example, if a rate of a type of events meets a threshold for that rate, then a behavior associated with the rates of the type of events may be determined as being anomalous behavior.

Coefficients, such as coefficient 224, are calculated to determine anomalous behaviors, such as anomalous behavior 222, utilizing several factors, behaviors, dimensions, and/or attributes. Each coefficient may be calculated for a group of events, the grouping of which may be by the components that have generated an event or similar events, and also by the type, class, or item of the events. Such a grouping may be referred to as a cluster/CTI. Coefficients allow the anomalous behaviors to be ranked. Coefficient 224 is calculated via factors or attributes that include severity 226, ticket correlation 228, and ticket mean time to resolution (MTTR) 230. When a threshold related to a coefficient is met, an alarm indicating as such may be sent to an administrator client. The terms used to calculate a coefficient that correspond to various behaviors, dimensions, and attributes, may be added or removed via an administrator client. Additionally, weights for additional terms of the coefficient may also be adjusted via an administrator client. Coefficients allow for the aggregation of multiple behaviors related to a group of events to be used to determine whether significant events related to one or more anomalous behaviors is occurring in the IT environment.

A coefficient may be calculated with the equation depicted below.

$$\text{Coefficient} = userSeverity \times \left( \sum_{i,j \subset Attributes} \begin{array}{l} \alpha_i \times \frac{|currentValue_i - MeanValue_i|}{MeanValue_i} + \\ TicketCorrelation_j + \\ TicketMTTR_j \end{array} \right)$$

For this equation, the coefficient is calculated by multiplying a user severity level (userSeverity) by a summation of data related to a number of attributes. The user severity level is a factor related to an administrator identified severity, which may take on any value (e.g., 2, 5, 10, etc.) with such values associated with a choice made by an administrator regarding the severity level (e.g., low, medium, high, etc.). Alternatively, the administrator may choose a value directly for the severity level.

The summation includes data related to individual attributes and the attributes are identified by i and j. Among other things, the attributes can be a relative deviation of the rate of an alarm, a relative change of workstations of a pool of workstations, and a mean time to remediation (MTTR).

The first term of the summation includes a weight, represented by $\alpha_i$, which is associated with an attribute. The weight is multiplied by a deviation of the attribute that is calculated by dividing an absolute value of the difference of a current value with a mean value by the mean value. The weighted deviation is added to a ticket correlation (TicketCorrelation), such as ticket correlation 228, which is added to a mean time to remediation (TicketMTTR), such as ticket MTTR 230.

For any equation used to determine a coefficient, an administrator controls each term used to calculate that coefficient. The administrator may pick the type and number of attributes to be used for a coefficient, the ticket correlation, and the mean time to remediation. The administrator may also assign a weight for each attribute used in the calculation and may also assign weights for the ticket correlation and the mean time to remediation. As indicated above, the administrator may also assign a severity that is applied to the coefficient as a whole.

Severity 226 is selected by a user to indicate a severity of anomalous behavior 222. The severity of anomalous behavior 222 may include any type of value or label including a numeric value or labels such as low, medium, or high.

Ticket correlation 228 is a value related to a correlation between previously received events that are similar to the events of anomalous behavior 222 and tickets associated with the previously received events that are similar to the events of anomalous behavior 222. When many of the previously received events are associated with tickets, then the correlation may be high. When few of the previously received events are associated with tickets, then the correlation may be low. When the correlation is high, this may indicate that a ticket will be submitted for event 216 unless it is remediated.

Ticket MTTR 230 is a value related to the mean time to remediate tickets associated with the previously received events that are similar to the events of anomalous behavior 222. A high value for ticket MTTR 230 may indicate that the events of anomalous behavior 222, such as event 216, may take a disproportionately long time to remediate or resolve.

Model 232 includes multiple behaviors, dimensions, and/or attributes that are determined from multiple previously received events of components 204 and serve as the bases to which the behaviors of events, such as behavior 220, are compared. A model allows for the inference of alarms, nominal behaviors, and trends based on analysis of historical data and previously received events, such as previously received event 218. A model may be periodically updated with new events that occur during a fixed period of time.

Group of options 234 is presented to an administrator via an administrator client, such as administrator client 208, to allow the administrator to remediate and resolve events, such as event 216. Group of options 234 includes drill down option 236, threshold management option 238, manual remediation option 240, and automatic remediation option 242.

Drill down option 236 is an option that allows for an administrator to view additional data related to behavior 220. The additional data may include the types, classes, and items of the events of a behavior.

Threshold management option 238 is an option that allows for an administrator to update a threshold related to a behavior or coefficient, such as behavior 220 or coefficient 224. Changing the threshold changes the likelihood that a behavior will be determined to be an anomalous behavior or that an alarm related to a coefficient will be sent an administrator client.

Manual remediation option 240 is an option that allows an administrator to manually remediate events of a behavior. After selecting a manual remediation option, the administrator may be presented with a script that includes steps for remediating events manually.

Automatic remediation option 242 is an option that allows an administrator to automatically remediate events of a behavior. After selecting an automatic remediation option, a script that automatically remediates events may be performed.

Figure 3:
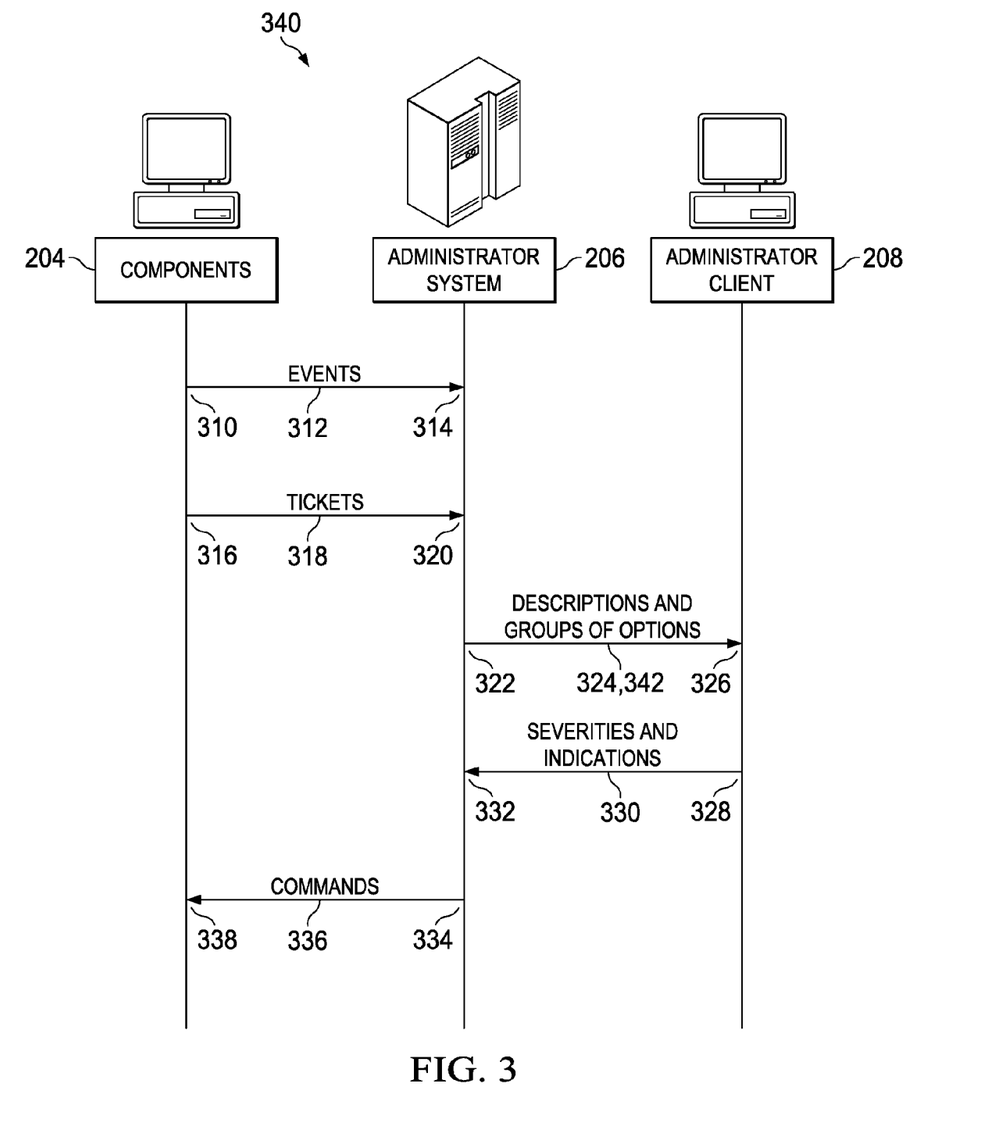
FIG. 3 is an illustration of data flow in the form of a data flow diagram in accordance with an illustrative embodiment.

Turning to FIG. 3, an illustration of data flow in the form of a data flow diagram is depicted in accordance with an illustrative embodiment. In this illustrative example, data flow 340 describes the data and messages passed back and forth between components 204, administrator system 206, and administrator client 208. The sending and receiving operations depicted within FIG. 3 are via one or more messages passed over a network between components 204, administrator system 206, and administrator client 208.

At 310, components 204 send events 312 to administrator system 206. At 314, administrator system 206 receives events 312 from components 204. Events 312 may include multiple events, including event 216.

At 316, components 204 send tickets 318 to administrator system 206. At 320, administrator system 206 receives tickets 318 from components 204. Tickets 318 may include multiple tickets, including ticket 210.

At 322, administrator system 206 sends descriptions 324 and groups of options 342 to administrator client 208. At 326, administrator client 208 receives descriptions 324 and groups of options 342 from administrator client 206. Descriptions 324 describe behaviors, such as behavior 220. Groups of options 342 may include group of options 234.

At 328, administrator client 208 sends severities and indications 330 to administrator system 206. At 332, administrator system 206 receives severities and indications 330 from administrator client 208. The severities may include severity 226 and the indications may indicate which option of group of options 234 is selected by an administrator via administrator client 208.

At 334, administrator system 206 sends commands 336 to components 204. At 338, components 204 receive commands 336 from administrator system 206. The commands remediate the events received from the components.

Figure 4:
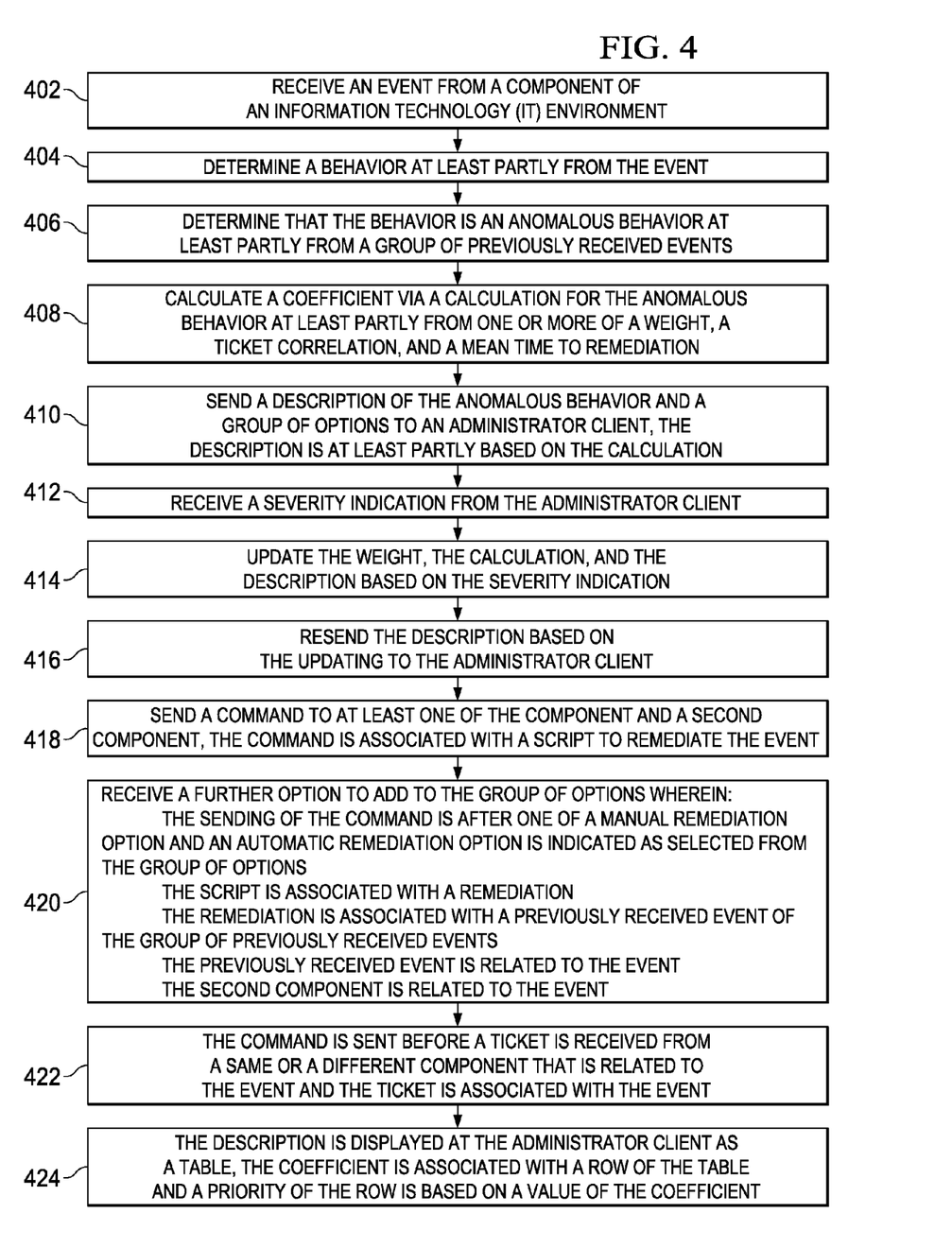
FIG. 4 is an illustration of a flowchart of a method of an administrator system in accordance with an illustrative embodiment.

Turning to FIG. 4, an illustration of a flowchart of a method of an administrator system is depicted in accordance with an illustrative embodiment. The administrator system may be administrator system 206 of FIG. 2.

At 402, the administrator system receives an event from a component of an information technology (IT) environment.

At 404, the administrator system determines a behavior at least partly from the event received at 402.

At 406, the administrator system determines that the behavior is an anomalous behavior at least partly from a group of previously received events.

At 408, the administrator system calculates a coefficient for the anomalous behavior at least partly from one or more of a weight, a ticket correlation, and a mean time to remediation.

At 410, the administrator system sends a description of the anomalous behavior and a group of options to an administrator client.

At 412, the administrator system receives a severity indication from the administrator client.

At 414, the administrator system updates the weight, the calculation, and the description based on the severity indication.

At 416, the administrator system resends the description based on the updating of the weight, the calculation, and the description to the administrator client.

At 418, the administrator system sends a command to at least one of the component and a second component, the command is associated with a script to remediate the event.

At 420, the administrator system receives a further option to add to the group of options. The sending of the command is after one of a manual remediation option and an automatic remediation option is indicated as selected from the group of options. The script is associated with a remediation. The remediation is associated with a previously received event of the group of previously received events. The previously received event is related to the event. The second component is related to the event.

At 422, the command is sent before a ticket is received from a same or a different component that is related to the event and the ticket is associated with the event.

At 424, the description is displayed at the administrator client as a table, the coefficient is associated with a row of the table and a priority of the row is based on a value of the coefficient.

Figure 5:
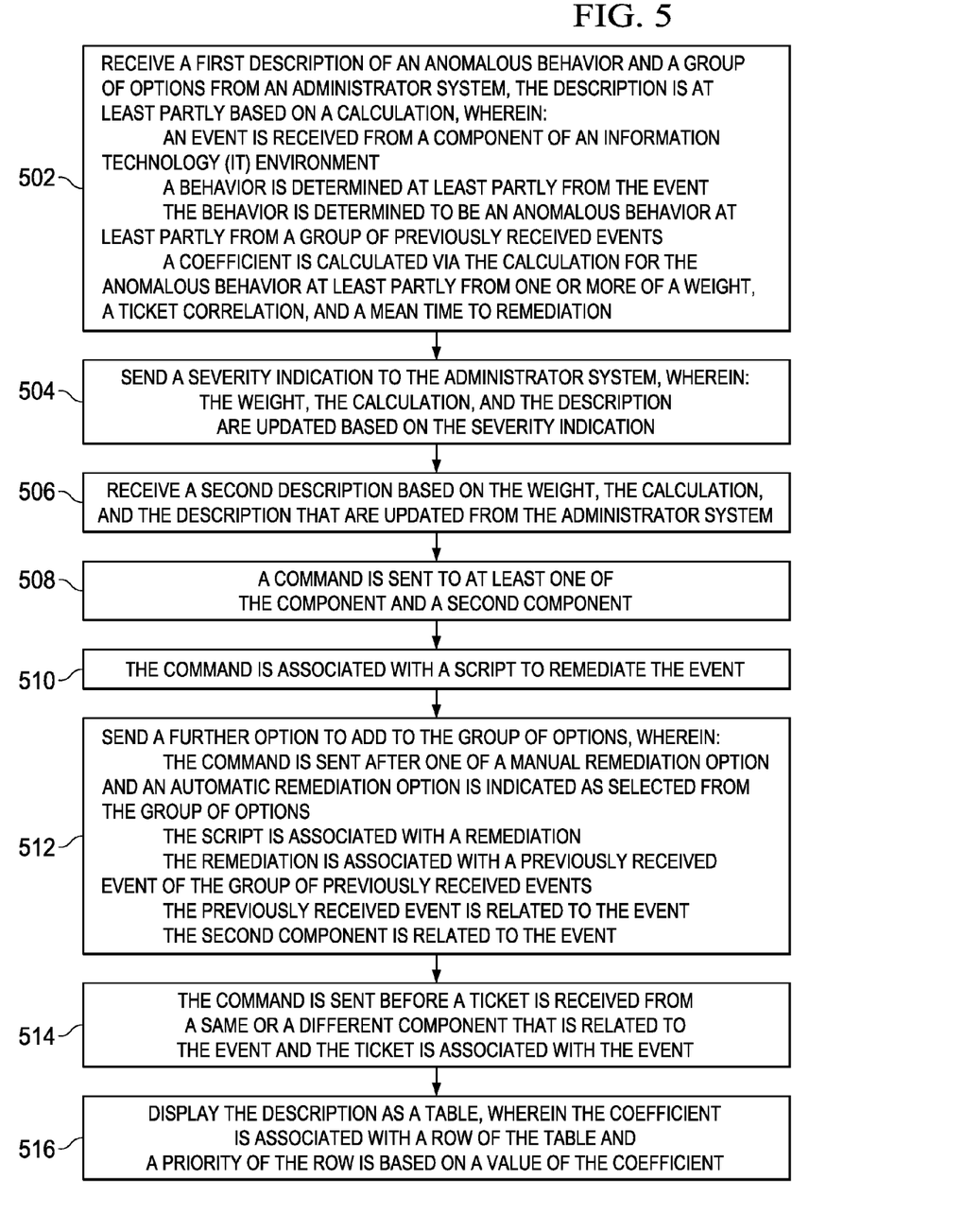
FIG. 5 is an illustration of a flowchart of a method of an administrator client in accordance with an illustrative embodiment.

Turning to FIG. 5, an illustration of a flowchart of a method of an administrator client is depicted in accordance with an illustrative embodiment. The administrator client may be administrator client 208 of FIG. 2.

At 502, the administrator client receives a first description of an anomalous behavior and a group of options from an administrator system. The description is at least partly based on a calculation. An event is received from a component of an information technology (IT) environment. A behavior is determined at least partly from the event. The behavior is determined to be an anomalous behavior at least partly from a group of previously received events. A coefficient is calculated via the calculation for the anomalous behavior at least partly from one or more of a weight, a ticket correlation, and a mean time to remediation.

At 504, the administrator client sends a severity indication to the administrator system. The weight, the calculation, and the description are updated based on the severity indication.

At 506, the administrator client receives a second description based on the weight, the calculation, and the description that are updated from the administrator system.

At 508, a command is sent to at least one of the component and a second component. The administrator client may initiate sending the command in a manual remediation, or alternatively, the administrator system may initiate sending command in an automatic remediation.

At 510, the command is associated with a script to remediate the event.

At 512, the administrator client sends a further option to add to the group of options. Additionally, the command is sent after one of a manual remediation option and an automatic remediation option is indicated as selected from the group of options. The script is associated with a remediation. The remediation is associated with a previously received event of the group of previously received events. The previously received event is related to the event. The second component is related to the event.

At 514, the command is sent before a ticket is received from a same or a different component that is related to the event and the ticket is associated with the event.

At 516, the administrator client displays the description as a table. Additionally, the coefficient is associated with a row of the table and a priority of the row is based on a value of the coefficient.

Figure 6:
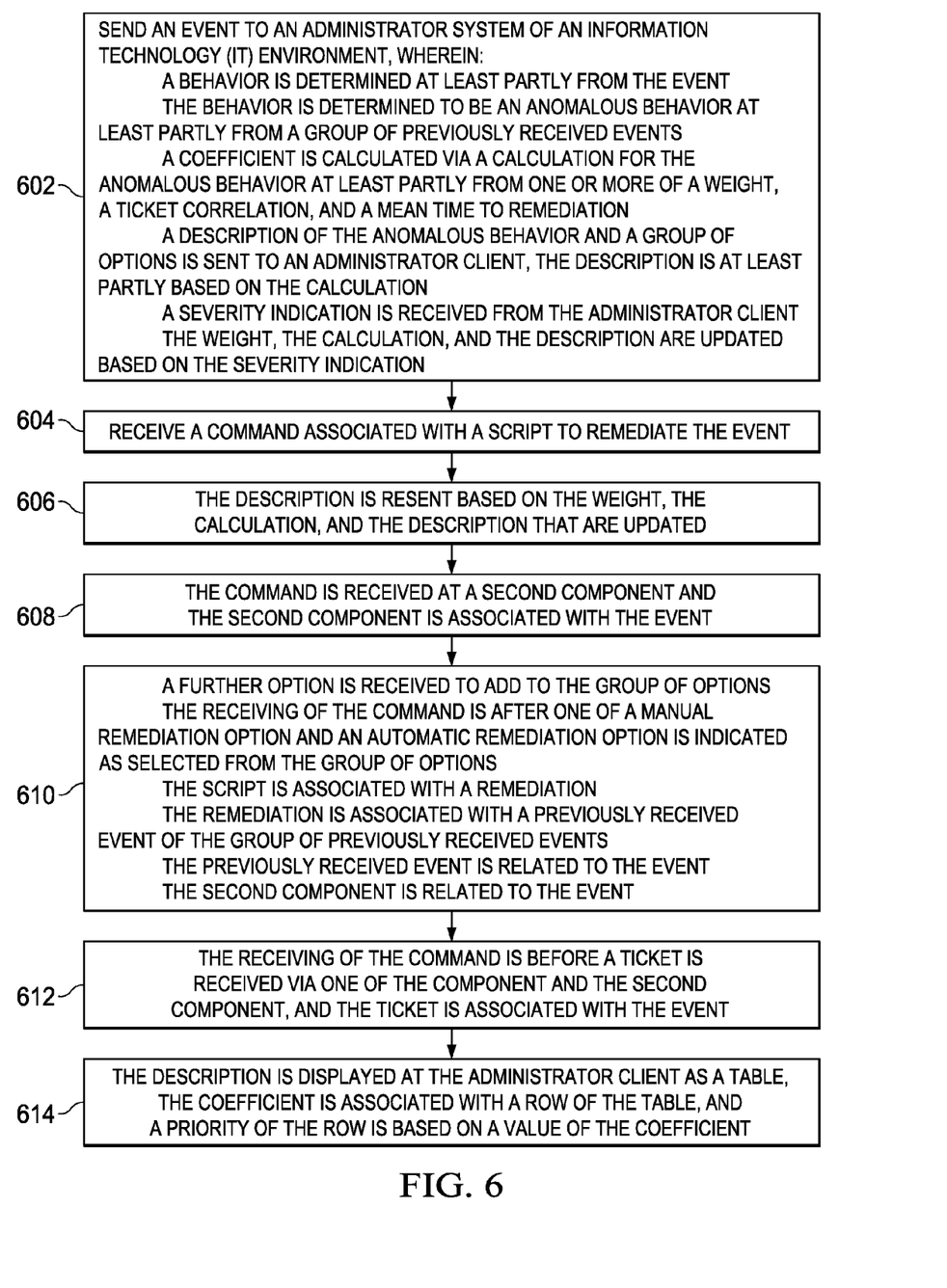
FIG. 6 is an illustration of a flowchart of a method of a component in accordance with an illustrative embodiment.

Turning to FIG. 6, a method of a component is depicted in accordance with an illustrative embodiment. The component may be a component of components 204 of FIG. 2.

At 602, a component of an information technology (IT) environment sends an event to an administrator system of the IT environment. A behavior is determined at least partly from the event. The behavior is determined to be an anomalous behavior at least partly from a group of previously received events. A coefficient is calculated via a calculation for the anomalous behavior at least partly from one or more of a weigh, a ticket correlation, and a mean time to remediation. A description of the anomalous behavior and a group of options is sent to an administrator client, the description is at least partly based on the calculation. A severity indication is received from the administrator client at the administrator system. The weight, the calculation, and the description are updated based on the severity indication.

At 604, the component receives a command associated with a script to remediate the event.

At 606, the description is resent to the administrator client based on the weight, the calculation, and the description that are updated.

At 608, the command is received at a second component. The second component is associated with the event. The association of the second component may be a passive association in which the association is implied, or the association may be inactive association that is created, for example, by the administrator system.

At 610, a further option is received to add to the group of options. The receiving of the command is after one of a manual remediation option and an automatic remediation option is indicated as selected from the group of options. The script is associated with a remediation. The remediation is associated with a previously received event of the group of previously received events. The previously received event is related to the event. The second component is related to the event.

At 612, the receiving of the command by the component is before a ticket is received via one of the component and the second component by the administrator system. The ticket is associated with the event.

Figure 7A:
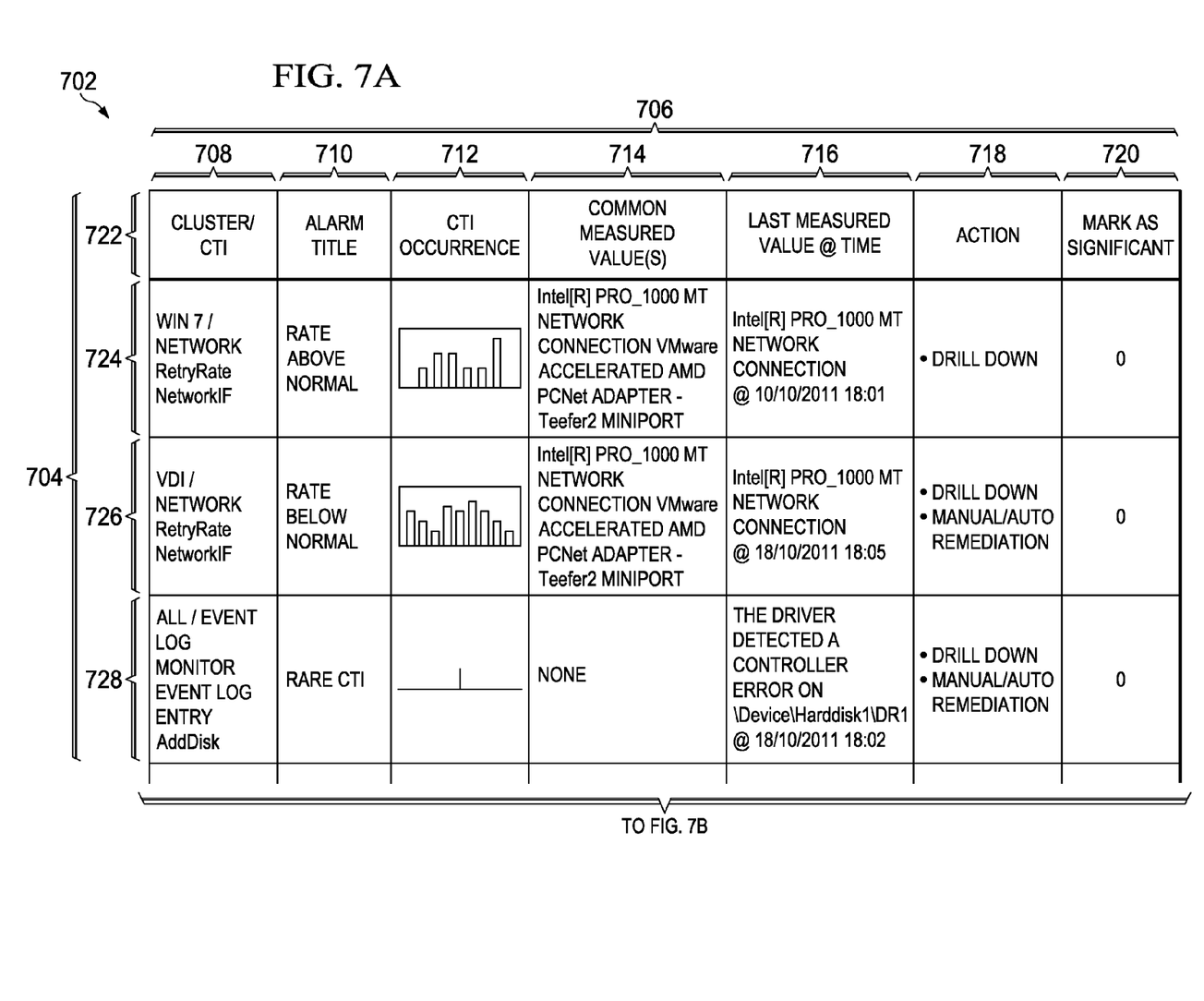
FIGS. 7A and 7b are illustrations of a user interface of an administrator client in accordance with an illustrative embodiment.
Figure 7B:
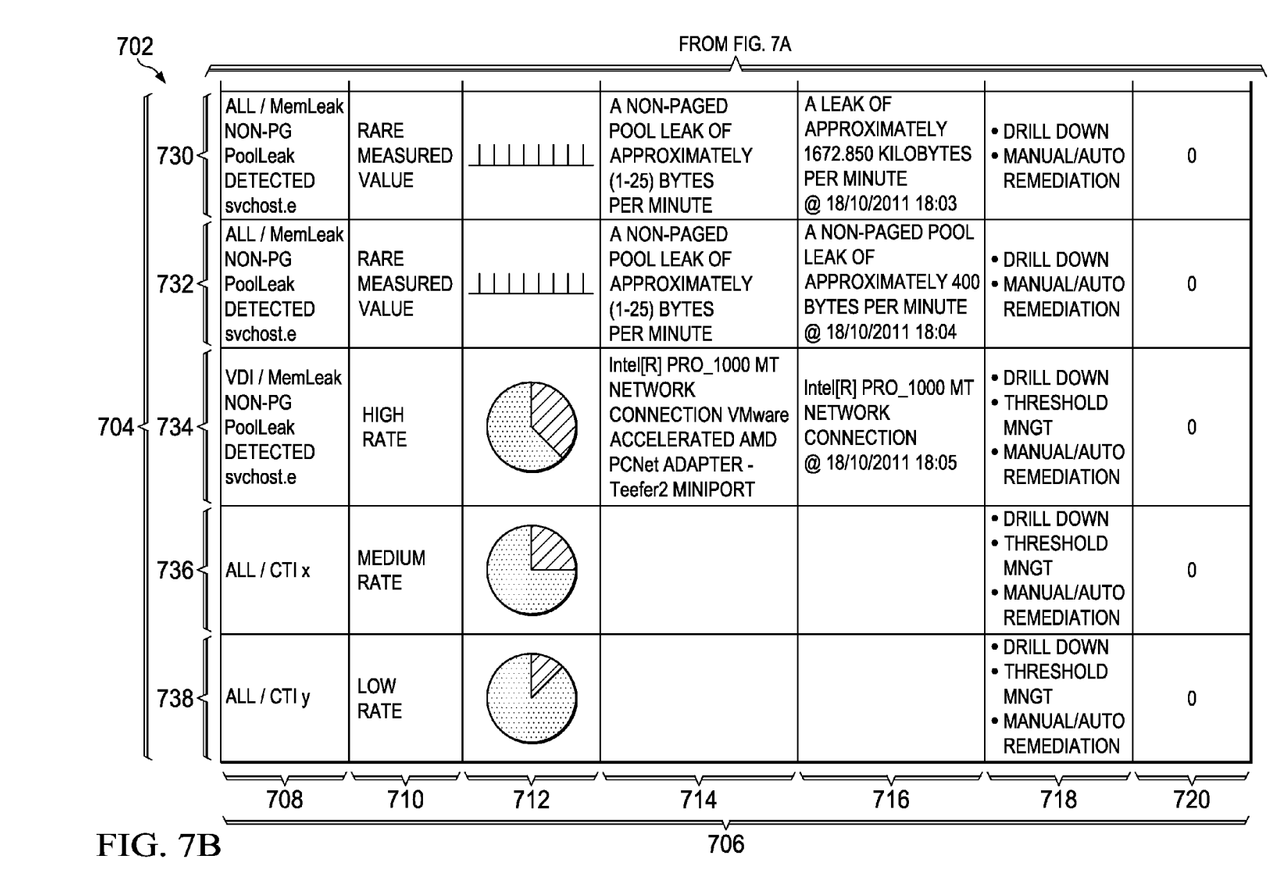

At 614, the description is displayed at the administrator client as a table. The coefficient is associated with a row of the table, and a priority of the row is based on a value of the coefficient Turning to FIGS. 7A and 7B, ILLUSTRATIONS OF a user interface of an administrator client is depicted in accordance with an illustrative embodiment. The administrator client may be administrator client 208 of FIG. 2.

A user interface of an administrator client includes table 702. Table 702 allows for interaction by the administrator with the administrator system via the administrator client. Table 702 comprises rows 704 and columns 706.

Rows 704 includes rows 722, 724, 726, 728, 730, 732, 734, 736, and 738. Row 722 is a header row that indicates the type of information in subsequent rows. Each row comprises a description of an anomalous behavior and a group of options related to the anomalous behavior. The description of the anomalous behavior is related to a coefficient whose value is greater than a threshold so as to indicate that the behavior is anomalous. Information used to calculate a coefficient along with a threshold related to that coefficient may be independently set and controlled by an administrator via administrator client 208.

Columns 706 include columns 708, 710, 712, 714, 716, 718, and 720. Each of columns 708, 710, 712, 714, 716, 718, and 720 provide information allowing for interaction with regard to anomalous behaviors of rows 704.

Column 708 provides information related to a cluster and a class, type, and item of an event that was received that is related to an anomalous behavior for a coefficient related to a row. A cluster of components 204 identifies which components 204 are related to a behavior of a row in rows 704. For example, column 708 indicates that row 724 is related to a cluster of components 204 that utilize WINDOWS 7, and that row 724 is related to events whose class, type, and item relate to behaviors and attributes that relate to a network retry rate of a network interface.

Column 710 provides information related to a title of an alarm. A title of an alarm gives an indication of a type of anomaly of a behavior for a row. Alarm titles may include rate above normal, rate below normal, rare event class, type, or item (CTI), rare measured value, high rate, medium rate, low rate, et cetera. For example, the alarm title of row 724 is a rate above normal, which indicates that a rate associated with a behavior of row 724 is anomalously above a normal value for that behavior.

Column 712 provides information related to occurrence of events having a class, type, and item related to a behavior of a row. The occurrence may be in the form of a chart or graph that indicates the historical occurrence along with the current occurrence of events related to a behavior of a row. A type of chart or ground may be based on the type of behavior of a row, such that certain behaviors may have a two dimensional graph, others may have a one dimensional graph, and others may have a pie chart. For example, rows 724 and 726 each comprise a two dimensional bar chart in column 712; rows 728, 730, and 732 each comprise a one dimensional graph in column 712; and rows 734, 736, and 738 each comprise a pie chart in column 712.

Column 714 provides information related to a common measure values for events of a behavior of a row. A common measure may include a mean value of an attribute, as discussed above in relation to an equation for calculating a coefficient.

Column 716 provides information related to the last mission value at a specific time. Information displayed in a row under column 716 includes a last measured value of an event related to a behavior of the respective row and includes a time stamp indicating a time that the last measured value of the event occurred.

Column 718 provides group of options 234 that may be used to remediate events associated with or causing anomalous behavior of a row or may be used to adjust and control a coefficient or threshold associated with a behavior or attribute. As discussed above, group of options 234 may include drill down option 236, threshold management option 238, manual remediation option 240, automatic remediation the option 242, etc. Alternative embodiments may have additional options that allow for manipulating terms and weights of an equation used to calculate a coefficient of a row, as described above.

Column 720 provides information related to a severity of a row. This may be in the form of a check box indicating a level of severity of a behavior of the row. Alternative embodiments may use the form of a drop down selection box with values of low, medium, and high to indicate a level of severity. Alternative embodiments may also use the form of an edit box that allows a numeric value to be entered to indicate a level of severity. This level of severity may be used as a userSeverity that is used to calculate a coefficient of a row, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer program product stored on a computer readable storage device having computer readable program code embodied thereon that is executable by a data processing system for remediating events using behaviors via an administrator system, the computer program product comprising:
   computer readable program code for receiving an event from a component of an information technology (IT) environment;
   computer readable program code for determining a behavior at least partly from the event;
   computer readable program code for determining that the behavior is an anomalous behavior at least partly from a group of previously received events;
   computer readable program code for calculating a coefficient via a calculation for the anomalous behavior at least partly from a weight;
   computer readable program code for sending a description of the anomalous behavior and a group of options to an administrator client, the description is at least partly based on the calculation;
   computer readable program code for receiving a severity indication from the administrator client; and
   computer readable program code for updating the weight, the calculation, and the description based on the severity indication.

2. The computer program product of claim 1, further comprising:
   computer readable program code for resending the description based on the updating to the administrator client.

3. The computer program product of claim 1, further comprising:
   computer readable program code for sending a command to at least one of the component and a second component.

4. The computer program product of claim 3, wherein:
   the command is associated with a script to remediate the event.

5. The computer program product of claim 4, further comprising:
   computer readable program code for receiving a further option to add to the group of options;
   wherein:
      the sending of the command is after one of a manual remediation option and an automatic remediation option is indicated as selected from the group of options;
      the script is associated with a remediation;
      the remediation is associated with a previously received event of the group of previously received events;
      the previously received event is related to the event; and
      the second component is related to the event.

6. The computer program product of claim 3, wherein:
   the sending of the command is before a ticket is received from a same or a different component that is related to the event; and
   the ticket is associated with the event.

7. The computer program product of claim 1, wherein:
   the calculating is at least partly from a ticket correlation; and
   the ticket correlation is a value related to a correlation between similar events of the group of previously received events that are similar to the event related to the anomalous behavior and a ticket associated with the similar events.

8. The computer program product of claim 1, wherein:
   the calculating is at least partly from a mean time to remediation; and
   the mean time to remediation is a value related to mean time to remediate a ticket associated with similar events of the group of previously received events that are similar to the event related to the anomalous behavior.

9. The computer program product of claim 1, wherein:
   the description is displayed at the administrator client as a table; and
   the coefficient is associated with a row of the table.

10. The computer program product of claim 9, wherein:
    a priority of the row is based on a value of the coefficient.

11. A computer program product stored on a computer readable storage device having computer readable program code embodied thereon that is executable by a data processing system for remediating events using behaviors via an administrator client, the computer program product comprising:
    computer readable program code for receiving a first description of an anomalous behavior and a group of options from an administrator system, the description is at least partly based on a calculation, wherein:
       an event is received from a component of an information technology (IT) environment;
       a behavior is determined at least partly from the event;
       the behavior is determined to be an anomalous behavior at least partly from a group of previously received events;
       a coefficient is calculated via the calculation for the anomalous behavior at least partly from a weight; and
    computer readable program code for sending a severity indication to the administrator system, wherein:
       the weight, the calculation, and the description are updated based on the severity indication.

12. The computer program product of claim 11, further comprising:
    computer readable program code for receiving a second description based on the weight, the calculation, and the description that are updated from the administrator system.

13. The computer program product of claim 11, wherein:
    a command is sent to at least one of the component and a second component.

14. The computer program product of claim 13, wherein:
    the command is associated with a script to remediate the event.

15. The computer program product of claim 14, further comprising:
    computer readable program code for sending a further option to add to the group of options;
    wherein:
       the command is sent after one of a manual remediation option and an automatic remediation option is indicated as selected from the group of options;
       the script is associated with a remediation;
       the remediation is associated with a previously received event of the group of previously received events;
       the previously received event is related to the event; and
       the second component is related to the event.

16. The computer program product of claim 13, wherein:
    the command is sent before a ticket is received from a same or a different component that is related to the event; and
    the ticket is associated with the event.

17. The computer program product of claim 11, wherein:
the calculation is at least partly based on a ticket correlation; and
the ticket correlation is a value related to a correlation between similar events of the group of previously received events that are similar to the event related to the anomalous behavior and a ticket associated with the similar events.

18. The computer program product of claim 11, further comprising:
computer readable program code for displaying the description as a table;
wherein:
the coefficient is associated with a row of the table;
the calculation is at least partly based on a mean time to remediation;
the mean time to remediation is a value related to mean time to remediate a ticket associated with similar events of the group of previously received events that are similar to the event related to the anomalous behavior; and
a priority of the row is based on a value of the coefficient.

19. A computer program product stored on a computer readable storage device having computer readable program code embodied thereon that is executable by a data processing system for remediating events using behaviors via component of an information technology environment, the computer program product comprising:
computer readable program code for sending an event to an administrator system of the information technology (IT) environment, wherein:
a behavior is determined at least partly from the event;
the behavior is determined to be an anomalous behavior at least partly from a group of previously received events;
a coefficient is calculated via a calculation for the anomalous behavior at least partly from a weight;
a description of the anomalous behavior and a group of options is sent to an administrator client, the description is at least partly based on the calculation;
a severity indication is received from the administrator client;
the weight, the calculation, and the description are updated based on the severity indication; and
computer readable program code for receiving a command associated with a script to remediate the event.

20. The computer program product of claim 19, wherein:
the description is resent based on the weight, the calculation, and the description that are updated.

21. The computer program product of claim 19, wherein:
the command is received at a second component.

22. The computer program product of claim 21, wherein:
the second component is associated with the event.

23. The computer program product of claim 22, wherein:
a further option is received to add to the group of options;
the receiving of the command is after one of a manual remediation option and an automatic remediation option is indicated as selected from the group of options;
the script is associated with a remediation;
the remediation is associated with a previously received event of the group of previously received events; and
the previously received event is related to the event.

24. The computer program product of claim 21, wherein:
the receiving of the command is before a ticket is received via one of the component and the second component; and
the ticket is associated with the event.

25. The computer program product of claim 19, wherein:
the calculation is at least partly based on a ticket correlation;
the ticket correlation is a value related to a correlation between similar events of the group of previously received events that are similar to the event related to the anomalous behavior and a ticket associated with the similar events;
the calculation is at least partly based on a mean time to remediation;
the mean time to remediation is a value related to mean time to remediate a ticket associated with similar events of the group of previously received events that are similar to the event related to the anomalous behavior;
the description is displayed at the administrator client as a table;
the coefficient is associated with a row of the table; and
a priority of the row is based on a value of the coefficient.

* * * * *